(12) United States Patent
Draper et al.

(10) Patent No.: US 6,581,062 B1
(45) Date of Patent: *Jun. 17, 2003

(54) METHOD AND APPARATUS FOR STORING SEMI-STRUCTURED DATA IN A STRUCTURED MANNER

(75) Inventors: Denise L. Draper, Seattle, WA (US); David B. Christianson, Seattle, WA (US); Konstantin L. Komissarchik, Brier, WA (US)

(73) Assignee: Nimble Technology, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/517,131

(22) Filed: Mar. 2, 2000

(51) Int. Cl.[7] .......................... G06F 17/30; G06F 15/00
(52) U.S. Cl. ...................... 707/100; 707/101; 707/102; 707/103 R; 707/104.1; 707/513
(58) Field of Search ................................ 707/513, 100, 707/101, 102, 103 R, 104.1

(56) References Cited

U.S. PATENT DOCUMENTS

| | | | |
|---|---|---|---|
| 5,826,258 A | 10/1998 | Gupta et al. | |
| 5,913,214 A | 6/1999 | Madnick et al. | |
| 5,956,720 A | 9/1999 | Fernandez et al. | |
| 5,970,490 A | 10/1999 | Morgenstern | |
| 6,012,098 A | 1/2000 | Bayeh et al. | |
| 6,076,087 A | 6/2000 | Suciu | |
| 6,094,649 A | 7/2000 | Bowen et al. | |
| 6,154,738 A | 11/2000 | Call | |
| 6,263,332 B1 * | 7/2001 | Nasr et al. | 707/5 |
| 6,269,368 B1 | 7/2001 | Diamond | |
| 6,308,179 B1 | 10/2001 | Petersen et al. | |
| 6,339,776 B2 * | 1/2002 | Dayani-Fard et al. | 707/102 |
| 6,343,287 B1 | 1/2002 | Kumar et al. | |
| 6,356,906 B1 | 3/2002 | Lippert et al. | |
| 6,356,920 B1 | 3/2002 | Vandersluis | |
| 6,449,620 B1 * | 9/2002 | Draper et al. | 707/102 |

FOREIGN PATENT DOCUMENTS

WO  WO 01/17286 A1 * 8/2001 ............ H04Q/7/20

OTHER PUBLICATIONS

Tufte et al., Relational Databases for Querying XML Documents, Proceedings of the 25th VLDB Conference, Edinburgh, Scotland, 1999.*

Florescu et al., A Performance Evaluation of Alternative Mapping Schemes for Storing XML Data in a Relational Database, Experience Paper, pp. 1–22.*

Tufte et al., Relational Databases for Querying XML Documents, Proccedings of the 25th VLDB Conference, Edinburgh, Scotland, 1999.*

Daniela Florescu et al, A Performance Evaluation of Alternative Mapping Schemes for Storing XML Data in a Relational Database, an –Experience Paper–, pp. 1–22.

Shanmugasundaram et al., "Relational Databases for Querying XML Documents:Limitations and Opportunities". In Proc. of the 25th VLDB Conf., Edinburgh, Scotland, 1999, 13 pgs.

* cited by examiner

Primary Examiner—Frantz Coby
(74) Attorney, Agent, or Firm—Perkins Coie LLP

(57) ABSTRACT

In response to the provision of a collection of semi-structured data (or its schema), a mapper generates a structured organization to store the collection of semi-structured data. The mapper further collaterally generates a description of how the semi-structured data are stored under the structured organization. In one embodiment, normalized relational tables are used for the structured organization. In alternate embodiments, non-normalized relational tables or other structured organization may also be used. The reverse, that is, the creation of a semi-structured data organization for a collection of structured data may also be performed.

77 Claims, 11 Drawing Sheets

```
<Entity A>
    <Entity B>
        <Entity C> Data </Entity C>
        <Entity D> Data </Entity D>
    </Entity B>
    <Entity E>
        <Entity F> Data </Entity F>
    </Entity E>
    <Entity G>
        <Entity F> Data </Entity F>
    </Entity G>
    <Entity H>
        <Entity I> Data </Entity I>
    </Entity H>
    <Entity H>
        <Entity I> Data </Entity I>
    </Entity H>
</Entity A>
```
54'

```
<directory> (100)                                        54"
        <person> (102)
                <name> (104)
                        <first> John </first>  (107, 124)
                        <last> Public </last>  (108, 126)
                </name> (128)
                <home> (105)
                        <address> (110)
                                <line 1> 123 Main St </line1> (112, 130)
                                <city> Anyville </city> (114, 132)
                                <state> WA </state> (116, 134)
                                <zip> 98198 </zip> (118, 136)
                        </address> (138)
                        <phone> 206-255-1234 </phone> (120, 140)
                </home> (142)
                <work> (106)
                        <phone> 206-555-5678 </phone> (122, 144)
                </work> (146)
        </person> (148)
</directoy> (150)
```

| In-Context 74a | Parent Node 74b | Child Node 74c | Out-Context 74d | Table 74e | Parent Column 74f | Child Column 74g |
|---|---|---|---|---|---|---|
|  | person | name |  | dir-tbl | per-id | nm-id |
|  | name | first |  | dir-tbl | nm-id | fn-id |
|  | first | data |  | dir-tbl | fn-id | fn-data |
|  |  |  |  |  |  |  |
|  | " | " | " | " | " | " |
|  |  |  |  |  |  |  |
|  | home | phone | h1 | hm-tbl | hm-id | ph-id |
| h1 | phone | data |  | hp-tbl | ph-id | ph-data |
|  | work | phone | w1 | wp-tbl | wk-id | ph-id |
| w1 | phone | data |  | wp-tbl | ph-id | ph-data |

56"

```
<xsl:stylsheet xmlns:xsl=http://www.w3.org/XSL/Transform/1.0>

<xsl:template match:"/">
        <result>
            <xsl: apply-templates
                select="companyrecords/employees/employee"/>
        </result>
    </xsl:template>

<xsl:template match:"employee">
        <xsl:variable name="depid" select=department/@idref/>
        <person>
            <xsl: apply-templates select="name"/>
            <number><xsl:value-of select="phone"/></number>
            <depname>
                <xsl: apply-templates
                    select="//department[@id=$depid]/name"/>
            </depname>
        </person>
    </xsl:template>
                                                            502

<xsl:template match:"employee/name">
        <xsl:value-of select= "first" />
        <xsl: text> </xsl:text>
        <xsl:value-of select= "last" />
    </xsl:template>

<xsl:template match:"department/name">
        <xsl:value-of select= "." />
    </xsl:template>

</xsl:stylesheet>
```

Figure 12a

```
<companyrecords>
    <employees>
        <employee>
            <name><first>fname</first><last>lname</last></name>
            <ssn>ssn</ssn>
            <department idref=deptid/>
            <phone>xxx-xxxx</phone>
        </employee>
    </employees>                                            504
    <departments>
        <department id=deptid>
            <name> dept name </name>
        </department>
    </departments>
</companyrecords>
```

Figure 12b (QueryLoop  "Select    name.first, name.last, employee.phone,
                      name2.pcdata,
            From      companyrecords, multiemployee,
                      Employee, name, companyrecords as cr2,
            Where     companyrecords.employees = multiemployee.id AND
                      cr2.departments = multidepartment.id AND
                      multidepartment.department = department.id AND
                      department.id = employee.idref,
                      department.name = name2.id)
                                                            506
(CreateElement "result")
    (Group "") // empty group operation groups all inside 'result"
        (CreateElement "person")
            (CreateText "$QL.1 $QL.2")
            (CreateElement "phone" body="$QL.3")
            (CreateElement "depname" body="$QL.4")

Figure 12c

METHOD AND APPARATUS FOR STORING SEMI-STRUCTURED DATA IN A STRUCTURED MANNER

BACKGROUND OF THE INVENTION

1. Field of the Invention

The present invention relates to the field of data processing. More specifically, the present invention relates to the storage of semi-structured data.

2. Background Information

Increasingly, because of its richness in functions and extensibility, information pages, such as web pages, are being constructed using the extensible style language (XSL) and semi-structured data, such as extensible markup language (XML) encoded data.

"Semi-structured data" refers to data that has structure, but where the contents of particular structural elements need not be consistent. To facilitate this characteristic, data are "self-describing". For example, in a "person" application, a person can be validly defined by semi-structured data with only a subset of all possible data associated with a person, e.g., by only a last name and a telephone number, or a first name, last name, and address, or some other combinations. Or, a person may be defined with additional data not previously seen, such as an employer name, an employer address, and an employer telephone number. Thus, each semi-structured "person" definition may vary.

"XML" is one example of a language for representing semi-structured data. XML is a subset of the Standard Generalized Markup Language (SGML), a system promulgated by the International Standards Organization (ISO) for organizing and tagging elements of a document. Interpretation of the XML tags, however, is left to an interpreter. Thus, XML is adaptable to a wide variety of purposes. In particular, since XML is based on plain text, and therefore, XML based documents can be received and processed by many different computing platforms, such as by a platform-independent browser or other networked application programs.

"Structured data", in contrast, refers to data formats such as those used for databases, spreadsheets, address books, and so forth, where in each case, the data format is well-defined by a schema and essentially inflexible. For example, in the database context, a database can be defined to store data according to some data-storage requirements. The storage requirements, e.g., the schema or nature of valid input, are known in advance, and the database is defined according to the structure of the potential input data. If the database were storing information about person, such as first name, last name, address, telephone number, and employer, every person record in the database would have space allocated for the information being tracked. Hence, the database is structured.

An example of a structured database is the relation database, also referred to as SQL database, where SQL is the name of its query language, Structured Query Language. In addition to being "inflexible", unlike semi-structured data, SQL databases are also platform dependent. Nevertheless, because of its availability as well as robustness, recent research has turned towards using structured databases, such as a SQL database, to store and retrieve information defined by semi-structured data.

One significant issue, however, is how to convert from semi-structured data, such as XML encoded data, to structured data storage, such as a SQL database. Towards this end, various approaches have been proposed. For example, see Florescu et al., *A Performance Evaluation of Alternative Mapping Schemes for Storing XML Data in a Relational Database*, Rapport de Recherche No. 3680, INRIA, Rocquencourt, France (May 1999), discusses techniques and issues related to using directed graphs to represent semi-structured data. And, Shanmugasundaram et al, *Relational Databases for Querying XML documents: Limitations and Opportunities*, Proceedings of the $25^{th}$ VLDB Conference, Edinburgh, Scotland (1999), discusses using XML document type descriptors (DTDs) to convert XML documents to relational tuples.

A significant limitation of these and other current conversion approaches is that mapping between structured and semi-structured data formats is by way of applying a fixed set of "rules" to perform the mapping. That is, in each of the these techniques, one and only one mapping is possible. For a given semi-structured input, the conversion rules control conversion into corresponding structured database output. The conversion is not flexible.

Thus, a more flexible approach to handling semi-structured data in a structured manner is desired.

SUMMARY OF THE INVENTION

In accordance with a first aspect of the present invention, a mapper generates a structured organization to store a collection of semi-structured data. Collaterally, the mapper also generates a description of how the semi-structured data are stored under the structured organization.

In accordance with a second aspect of the present invention, a mapper generates a semi-structured data organization for a collection of structured data. In like manner, the mapper also collaterally generates a description of correspondence between the semi-structured data organization and the structured data.

BRIEF DESCRIPTION OF DRAWINGS

The present invention will be described by way of exemplary embodiments, but not limitations, illustrated in the accompanying drawings in which like references denote similar elements, and in which:

FIGS. 12a–12c illustrate an example pre-processing of an information page;

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Parts of the description will be presented using terms such as tables, keys, identifiers and so forth, commonly employed by those skilled in the art to convey the substance of their work to others skilled in the art. Parts of the description will be presented in terms of operations performed by a computer system, using terms such as parsing, accessing, retrieving, and so forth. As well understood by those skilled in the art, these quantities take the form of electrical, magnetic, or optical signals capable of being stored, transferred, combined, and otherwise manipulated through mechanical and electrical components of a digital system; and the term digital system include general purpose as well as special purpose data processing machines, systems, and the like, that are standalone, adjunct or embedded.

Various operations will be described as multiple discrete steps performed in turn in a manner that is most helpful in understanding the present invention, however, the order of description should not be construed as to imply that these operations are necessarily order dependent, in particular, the order the operations are presented. Furthermore, the phrase "in one embodiment" will be used repeatedly, however the phrase does not necessarily refer to the same embodiment, although it may.

Figure 1:
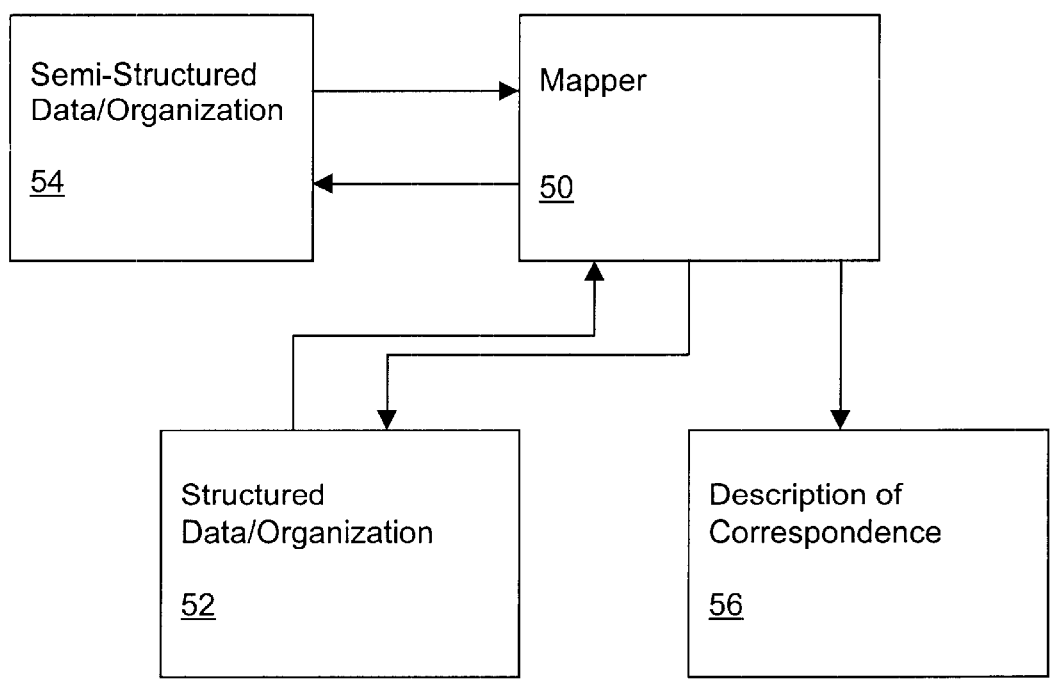
FIG. 1 illustrates an overview of the mapping aspect of the present invention.

Referring now to FIG. 1, wherein a block diagram illustrating an overview of the data representation aspect of the present invention, in accordance with one embodiment. As illustrated, mapper 50 incorporated with the teachings of the present invention, is equipped to generate structured organization 52 to store semi-structured data 54. Collaterally, mapper 50 also generates description 56 of how semi-structured data 54 are stored under structured organization 52. As will be described in more detail below, the collateral generation of description 56 advantageously enables mapper 50 to generate structured organization 52 in any one of a number of approaches. That is, under the present invention, unlike any of the prior art techniques, the generation of structured organization 52 is not bounded or fixed to one particular mapping approach.

Figures 2A, 2B:
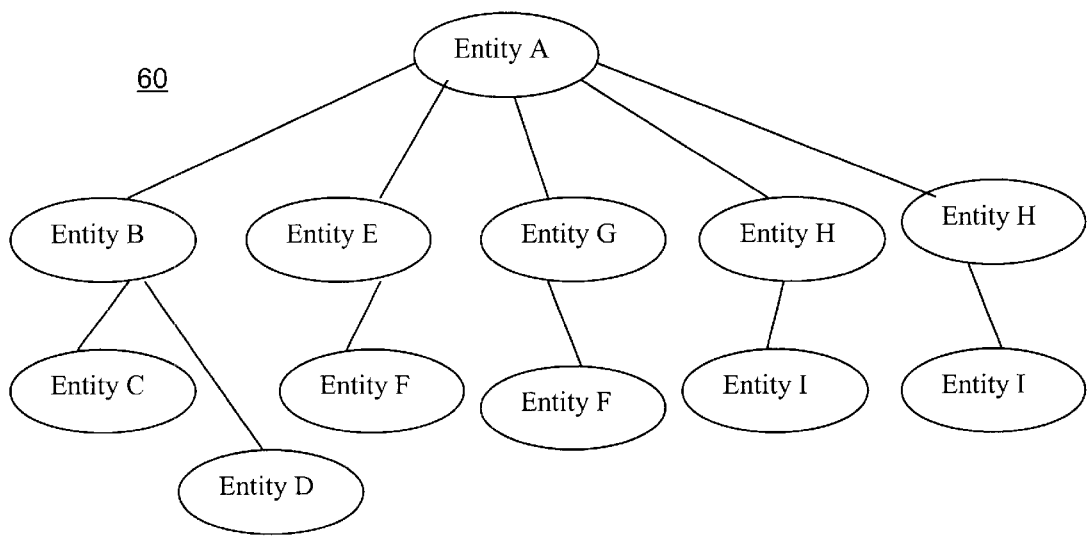
FIGS. 2a–2b illustrate semi-structure data and its logical representation, in accordance with one embodiment.

FIGS. 2a–2b illustrate semi-structured data and its logical representation, in accordance with one embodiment. As illustrated, semi-structured data 54' includes a number of entities or data elements, each delineated by a pair of tags, e.g. entity A by tags <entity A> and </entity A>, entity B by tags <entity B> and </entity B>, and so forth. Some entities, like entities F and H have multiple instantiations. The entities/instantiations have an hierarchical relationship to each other; and may be logically represented by tree structure 60, having corresponding number of nodes, one for each entity/instantiation, and edges interconnecting the nodes whose represented entities/instantiations are direct ancestors/descendants of each other, as shown.

Entity A is said to be the parent entity of entities B, E, G and H. Entities B, E, G and H are said to be the children entities of entity A. Similarly, entity B is said to be the parent entities for entities C and D respectively, whereas entities E, G and the two instantiations of entity H are the parent entities for the two instantiations of entity F, and the two instantiations of entity I respectively. The two instantiations of entity F, and the two instantiations of entity I are said to be the children entities of E, G and the two instantiations of entity H respectively.

The two instantiations of entity F are said to be instantiated in two contexts, the context of entity E and the context of entity G. An example is a "phone" entity instantiated in the context of a "home" entity, and in the context of a "work" entity, i.e. in first case, a home phone number, and in the second case, a work phone number. The two instantiations of entities H and I are said to be repeated occurrences of the entities. An example is an "offspring" entity and its descendant "offspring name" entity, where each occurrence represents a son/daughter of a person.

Figures 3, 4:
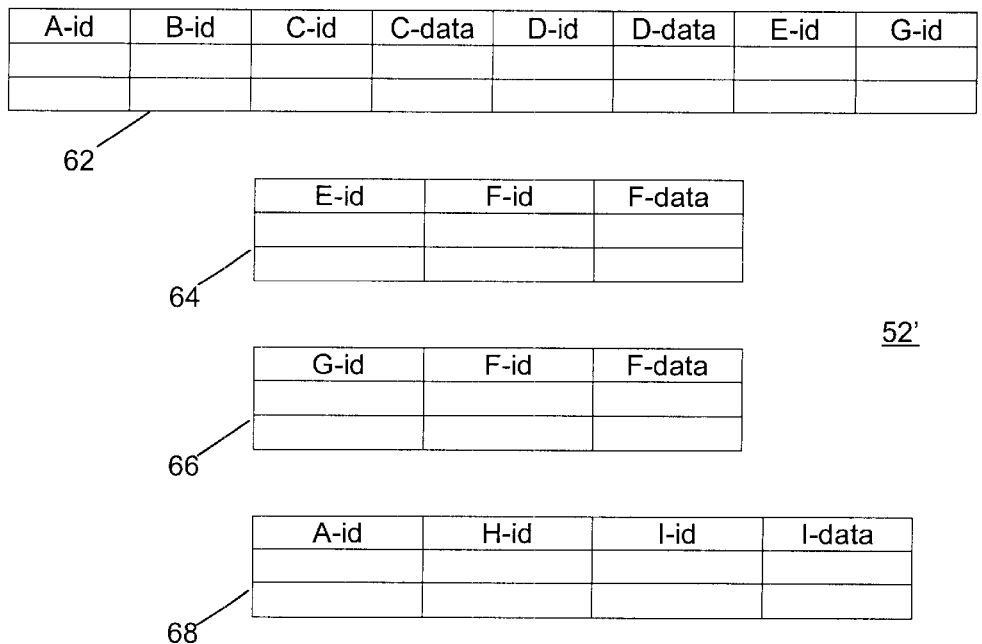
FIG. 3 illustrates a structured organization for storing the semi-structured data of FIG. 2a–2b, in accordance with one embodiment.
FIG. 4 illustrates a description of correspondence between the semi-structured data and the structured storage, in accordance with one embodiment.

FIG. 3 illustrates a structured organization for storing the semi-structured data of FIGS. 2a–2b, in accordance with one embodiment. As illustrated, structured organization 52' includes four relational tables 62–68. Table 62 includes one column each for storing identifiers of entities A, B, C, D, E, and G, and data for entities C and D. Table 64 includes one column each for storing identifiers for entities E and F, and data for entities F, whereas table 66 includes one column each for storing identifiers for entities G and F, and data for entities F. Similarly, table 68 includes one column each for storing identifiers for entities A, H and I, and data for entity I. The organization of these relational tables is characterized by the fact that entities having the possibility of multiple instantiations are stored in separate tables. The approach is said to be a normalized organization of the relational tables.

FIG. 4 illustrates description of correspondence between the semi-structured data and the generated structured organization, in accordance with one embodiment. As illustrated, description 56' is a meta-table having a number of row entries 72, one for each pair of parent and child nodes. Meta-table 56' includes seven columns 74a–74g, storing identifiers for the in-context, the parent node, the child node, the out-context, the storage table, the parent column and the child column. That is, columns 74a–74d track the hierarchical information of semi-structured data 54, and columns 74e–74g track the storage location information of the structured organization 52. Additionally, meta-table 56' includes a number of miscellaneous columns (not shown) for storing various flags and annotations. These miscellaneous flags and annotations include e.g. a flag that distinguishes between an "element" versus an "attribute", an annotation that denotes whether a child can occur more than once with respect to a parent, another annotation that denotes whether the child must occur at all. Each row entry 72 always contains information in columns 74b–74c and 74e–74g. Row entries 72 for parent-child pairs involving multiple instantiations also contain information in the "context" columns 74a and 74d. Where applicable, row entries 72 also include the aforementioned flags and annotations.

Figure 5:
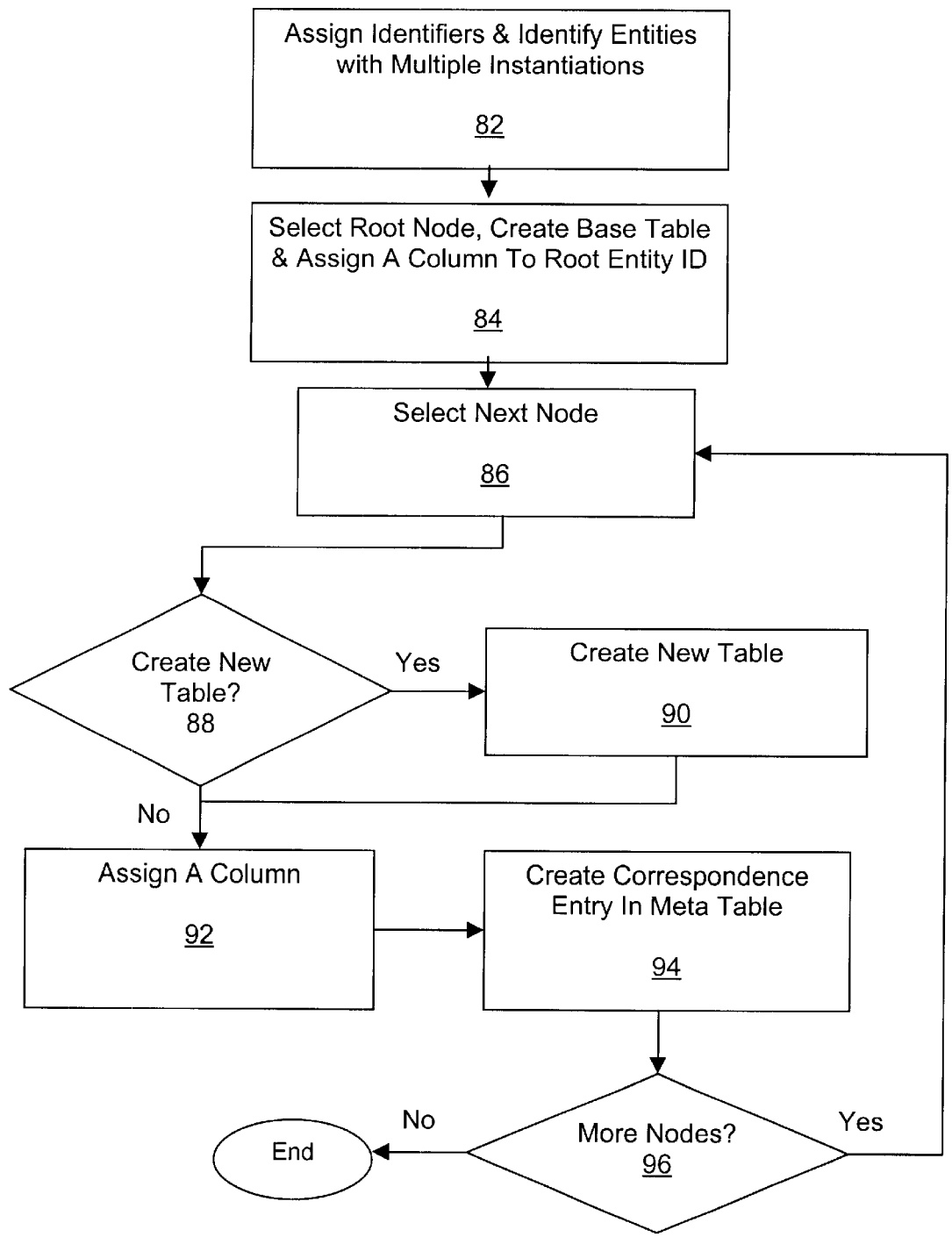
FIG. 5 illustrates the operation flow of the mapper of FIG. 1, in accordance with one embodiment.

FIG. 5 illustrates the operation flow for mapper 50, in accordance with one embodiment. In this embodiment, it is assumed that structured organization 52 is generated in the normalized approach described earlier, referencing FIG. 3, and meta-table 56' of FIG. 4 is employed for description 56. As illustrated, at 82, mapper 50 traverses a logical representation of semi-structured data 54 assigning identifiers to all entities (and if applicable, their multiple instantiations). At the same, mapper 50 also keeps track of all entities with multiple instantiations, as well as setting the applicable flags and recording the applicable annotations. At 84, mapper 50 selects the root node, creates a base table, and assigns a first column of the base table for the root entity.

At 86, mapper 50 selects a next node. At 88, mapper 50 determines if a new table should be created to store data associated with the entity. For the illustrated embodiment, a new table is created if the entity is one that has multiple instantiations, and a separate table has not been previously created. In alternate embodiments, other criterion or criteria may be employed to determine whether a new table is to be employed or not. If a new table is to be employed, the new table is created at 90. Otherwise 90 is skipped. At 92, a column is assigned to store the identifier/data associated with the entity. At 94, an entry is added to meta-table 56' to keep track of where the identifier/data of the entity is stored. As described earlier, the entry includes parent node information, its own node information, the table name/identifier, the column location of the parent, and its own column location. For entity or parent entity with multiple instantiations requiring context differentiation, either an out-context identifier or an in-context identifier is also stored. Context identifiers may be formed in any manner. Where applicable, the entry also includes the applicable flags and annotations.

At 96, mapper 50 determines if it has processed all nodes. If additional nodes are to be processed, operations 86–94 are repeated. The operations are repeated as many times as it is necessary to process all nodes. In due course, all nodes are processed. At such time, the processing terminates.

Figures 6A, 6B:
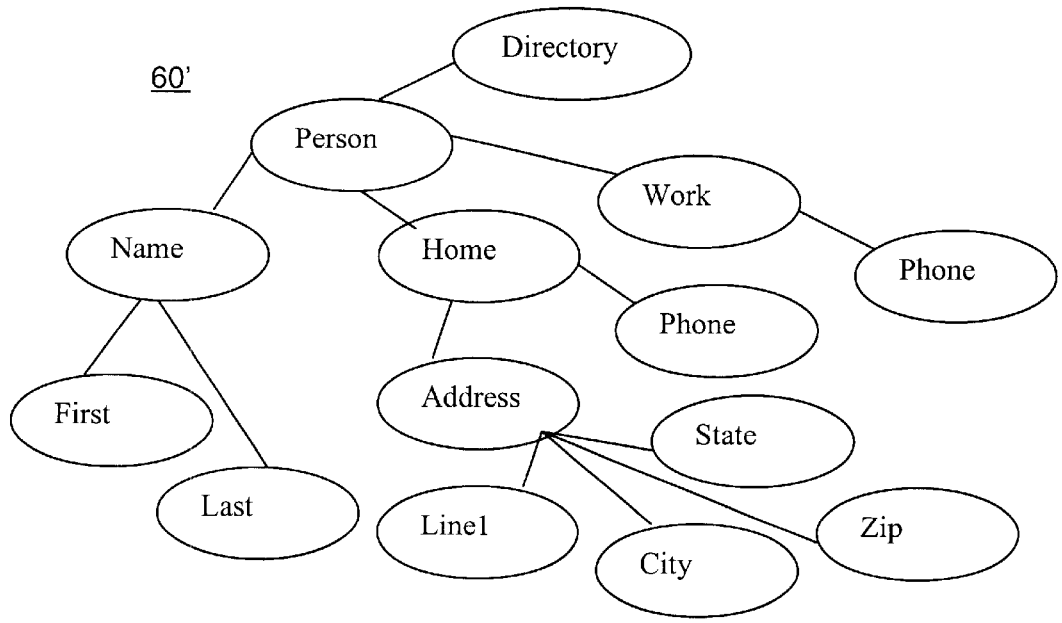
FIGS. 6a–6b illustrate an example semi-structure data and its logical representation.

FIGS. 6a–6b illustrate an example semi-structured data 54" and its logical representation. The example "directory" semi-structured data 54", delineated by the <directory> and </directory> tags 100 and 150, as illustrated in FIG. 6a, includes the entities "person", "name", "first name", "last name", "home", "address", "line1", "city", "state", "zip", "phone" (in the context of "home"), "work", and "phone" (in the context of "work"), delineated by the respective tag pairs, i.e. 102 and 148, 104 and 128, and so forth. The example "directory" semi-structured data may be logically represented by tree structure 60' of FIG. 6b. Tree structure 60' includes root node "directory" 162, "person" node 164, "name" node 166, "first name" node 168, "last name" node 170, "home" node 172, "address" node 174, "line 1" node 176, "city" node 178, "state" node 180, "zip" node 182, "home phone" node 184, "work" node 186, and "work phone" node 188.

Figures 7, 8:
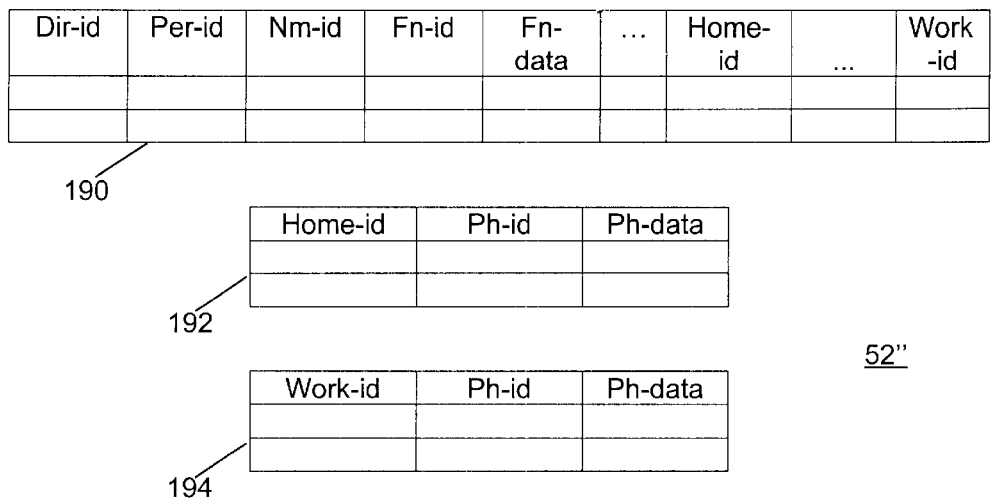
FIG. 7 illustrates an example structured data for storing the semi-structured data of FIG. 6a–6b.
FIG. 8 illustrates an example description of correspondence between the semi-structured data and the structured storage of FIG. 6a–6b and 7.

FIG. 7 illustrates the resulting structure organization 52" generated by mapper 50 to store the semi-structured data 54", in accordance with the earlier described embodiment referencing FIGS. 3 and 5. As illustrated, structure organization 52" includes tables 190–194. Directory table 190 stores person id, name id, first name id, first names, last name id, last names, home id, address id, line 1 id, line 1 data, city id, city names, state id, state names, zip id, zip code, and work id (not all columns are shown). Home phone table 192 stores home id, phone id, and phone numbers (home), whereas work phone table 914 stores work id, phone id and phone numbers (work).

FIG. 8 illustrates the resulting meta-table 56" generated by mapper 50 to store the correspondence between the semi-structured data of FIG. 6a–6b and the structured organization of FIG. 7, in accordance with the earlier described embodiment referencing FIGS. 4–5. As described earlier, each entry contains the information for each parent-child node pair pointing to the table and column storage locations for the parent and child identifier/data (not all rows are shown). The entries for the home and phone node pair, and the work and phone node pair include the storage of a context qualifier (arbitrarily named as "h1" and "w1") identifying which phone and data node pair points to the correct storage locations for the phone data. For ease of understanding, the miscellaneous flags and annotations are omitted.

Note that in addition to the already mentioned advantage that mapper 50 may employ any one of a number approaches to generate structured organization 52, the present invention also allows a data base administrator (DBA) to manually intervene and adjust the generated structured organization 52. The DBA may easily maintain the correspondence by making like kind adjustments to the collaterally generated meta-table 56. Such adjustments are often desirable as in real life applications, by virtue of the number of entities involved, which is typically much larger than the illustrated examples (as they were kept small for ease of understanding), the generated structured organization 52 may not be as efficient as desired.

Referring now back to FIG. 1, in accordance with another aspect of the present invention, mapper 50 incorporated with the teachings of the present invention, is also equipped to generate semi-structured data organization 54 for a collection of structured data 52. In like manner, mapper 50 also collaterally generates description 56 of correspondence between semi-structured data organization 54 and structured data 52. Thus, the present invention also advantageously enables legacy structured data to be employed in a semi-structured manner.

Figure 9:
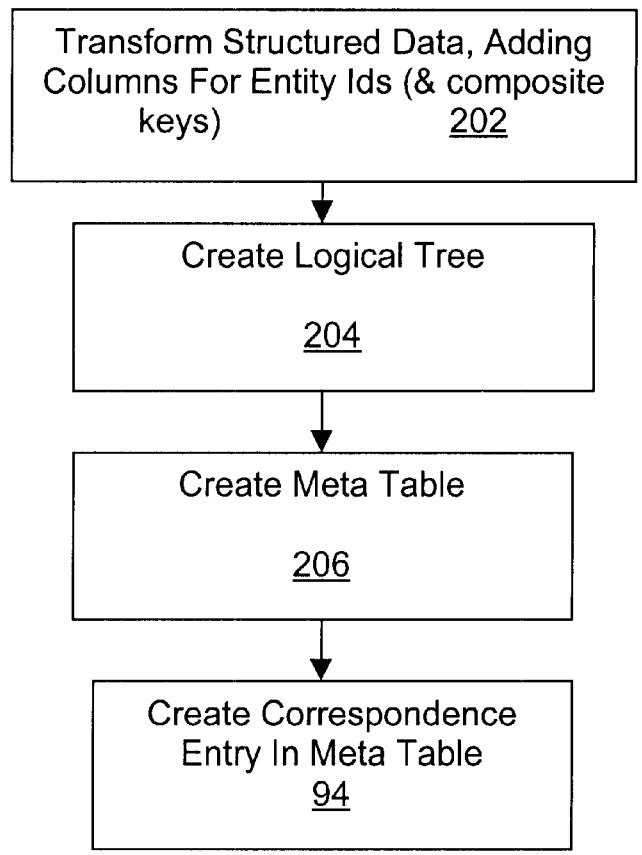
FIG. 9 illustrates the operational flow of mapper 50 for generating semi-structured organization for structured data.

FIG. 9 illustrates the operational flow of mapper 50 for generating semi-structured organization 54 for structured data 52. At 202, mapper 50 transforms structured data 52 adding corresponding companion columns to the tables to store entity identifiers for the stored entity data. In one embodiment, mapper 50 also adds corresponding columns to the tables to store a composite key formed with the access keys of the tables. For example, in a table, having two columns storing the last and first names of persons as accessing keys, a column is added to store a composite key formed with the last and first names of the persons. At 204, mapper 50 constructs a logical tree structure similar to the ones illustrated in FIG. 2b and 6b, based on the columns storing entity identifiers. At 206, mapper 50 creates meta table 56 as described earlier. At 208, mapper 50 generates semi-structured organization 54 using the generated logical tree structure.

Accordingly, the vast volume of legacy structured data may be employed in modern information pages using semi-structured data.

Figure 10:
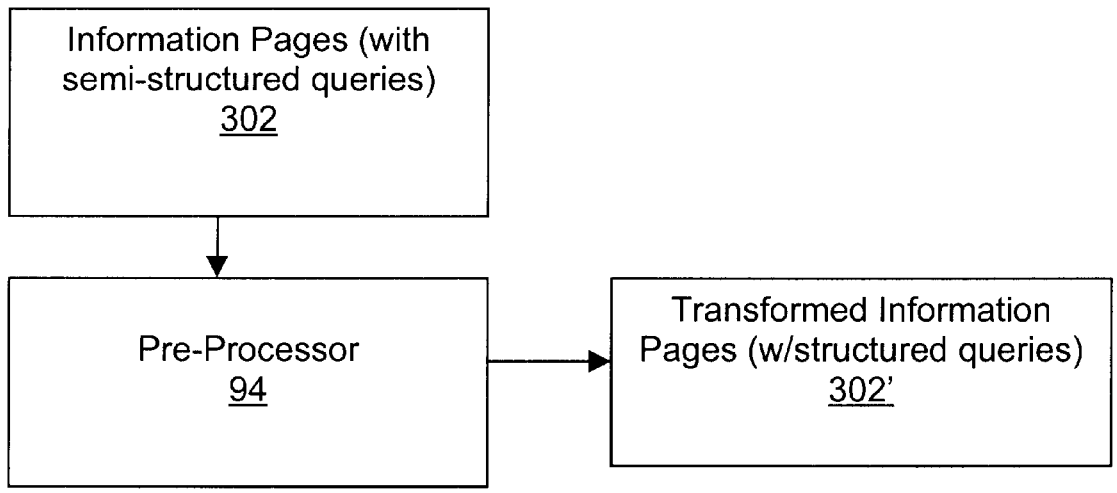
FIG. 10 illustrates the pre-processing aspect of the present invention.

FIG. 10 illustrates an overview of yet another aspect of the present invention. Shown are information pages 302 formed using a language that allows for the use of semi-structured queries, such as XSL, and employment of semi-structured data, like XML encoded data, stored in a structured manner. The correspondence between the semi-structured data and the structured organization are described using the earlier described meta-table or a description mechanism of like kind. Pre-processor 304, incorporated with the teachings of the present invention, is equipped to pre-compile information pages 302, to generate pre-processed information pages 302', replacing the semi-structured queries with equivalent structured queries to retrieve the required data from the structured data storage. Thus, at fulfillment time, that is in response to a request for one of the information pages, the requested information page may be dynamically completed with the required data, without having to determine in real time where the required semi-structured data are stored in the structured data storage. As a result, a request may be fulfilled with a shorter latency. In other words, the present invention also advantageously enables speed up of fulfillment of requested information pages that have to be dynamically completed with semi-structured data retrieved in real time.

Figure 11:
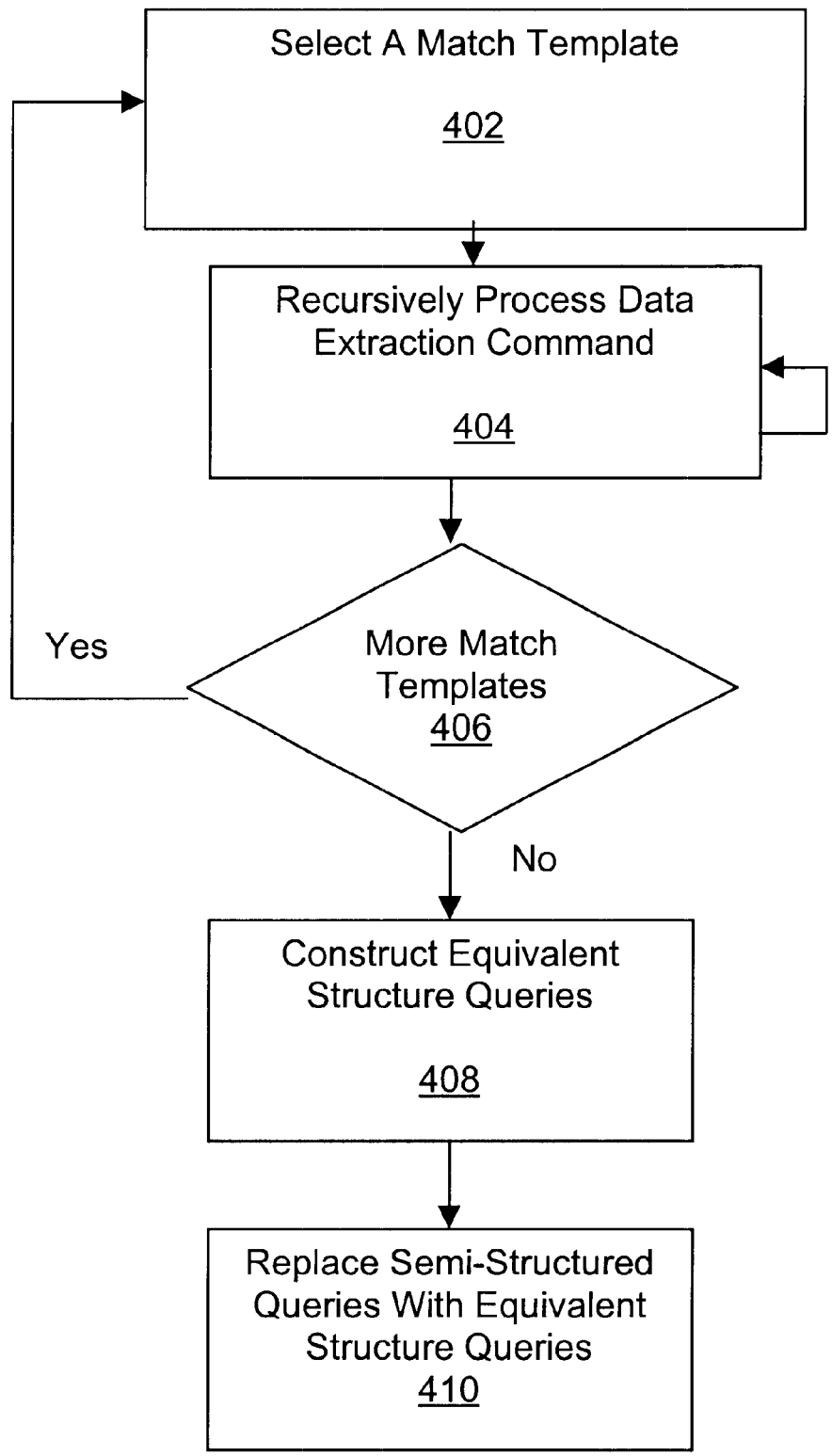
FIG. 11 illustrates the operation flow of the pre-processor of FIG. 10, in accordance with one embodiment.

FIG. 11 illustrates the operational flow of pre-processor 304, in accordance with one embodiment. At 402, pre-processor 304 selects a match template for pre-processing. At 404, pre-processor 304 recursively pre-processes data extraction commands within the selected match template, using the above described meta-table. Pre-processor 304 identifies the entity of the semi-structured data, whose data are to be extracted. Pre-processor 304 then uses the meta-table to determine the storage locations for the entity data in the structured data storage. Where necessary, pre-processor 304 cumulates the join conditions for joining the relational tables of the structured data storage to extract the required entity data. At 406, pre-processor determines if all match templates have been processed. If additional match templates are to be processed, operations 402-404 are repeated. Operations 402-404 are repeated as many times as necessary, until all match templates are processed. In due course, all match templates are processed. At such time, 408, pre-processor 304 uses the cumulated information and generates equivalent structured queries to retrieve the required data from the structured data storage. Where applicable, the generation may include generation of an associated control structure to control the repeated execution of a structured query, to iteratively obtain all or a subset of the required data from the structured data storage. At 410, pre-processor 304 replaces the semi-structured query/queries with the generated equivalent structured query/queries, and associated control structure or structures, if any.

Thus, pre-processed information pages 302' are now primed to readily respond to their requests. FIGS. 12a-12c illustrate a specific example of pre-processing an information page. Shown in FIG. 12a is an example XSL document 502 having a number of match templates. Each matching template includes one or more data extraction commands, such as select, value-of, apply template, and the like. FIG. 12b illustrates a schema of the underlying semi-structured data 504. FIG. 12c illustrates the resulting replacement structured query ("Query Loop") 506, including the join conditions, and the control structure to re-use the structured query ($QL.1, $QL.2, and so forth).

Figure 13:
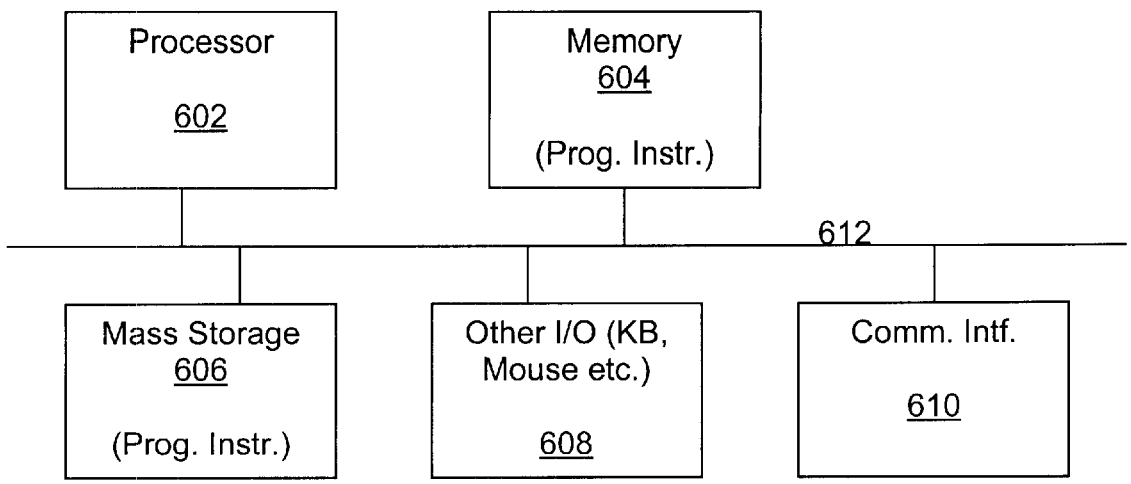
FIG. 13 illustrates a computing environment suitable for practicing the mapping and pre-processing aspects of the present invention.

FIG. 13 illustrates an example computing environment suitable for practicing the mapping and the pre-processing aspects of the present invention. Example computing environment 600 includes one or more processors 602 and system memory 604. Additionally, computing environment 600 includes mass storage devices 606 (such as diskette, hard drive, CDROM and so forth), input/output devices 608 (such as keyboard, cursor control and so forth) and communication interfaces 610 (such as network interface cards, modems and so forth). The elements are coupled to each other via system bus 612, which represents one or more buses. In the case of multiple buses, the buses are bridged by one or more bus bridges (not shown). Each of these elements perform its conventional functions known in the art. In particular, system memory 604 and mass storage 606 are employed to store a working copy and a permanent copy of the programming instructions implementing the earlier described mapper and/or pre-processor of the present invention. In one embodiment, the implementing programming instructions are a subset of a larger collection of programming instructions implementing a development toolkit that facilitates development of applications that access databases. In another embodiment, the implementing programming instructions are a subset of a large collection of programming instructions implementing a database manager and related functions. The permanent copy of the programming instructions may be loaded into mass storage 606 in the factory, or in the field, through a distribution medium (not shown) or through communication interface 610 (from a distribution server (not shown)). The constitution of these elements 602-612 are known, and accordingly will not be further described.

Figure 14:
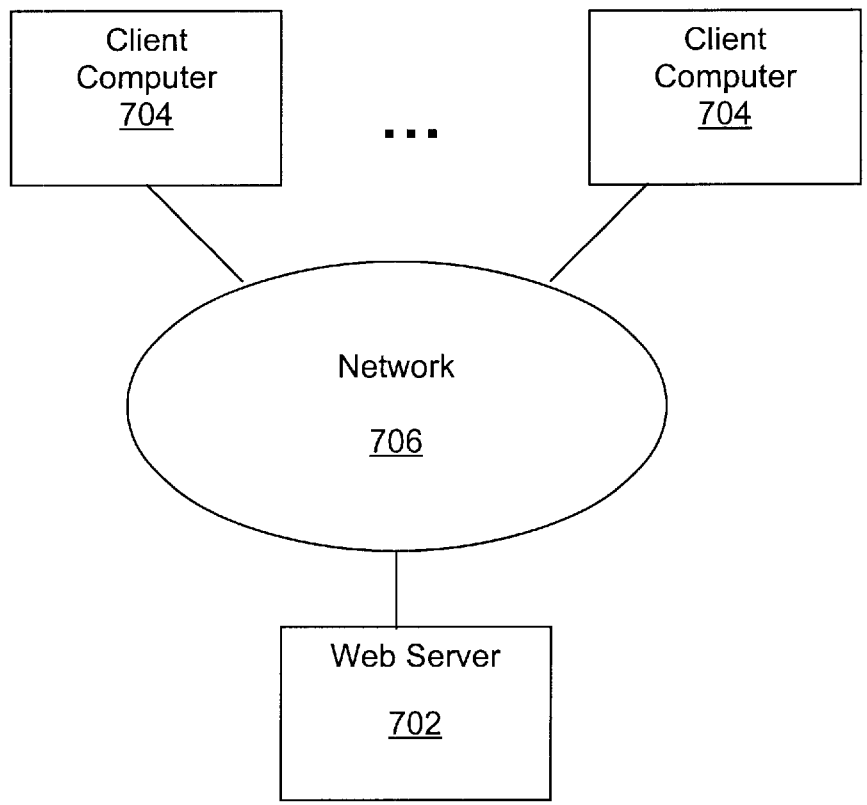
FIG. 14 illustrates a network environment suitable for using the information pages pre-processed in accordance with the present invention.

FIG. 14 illustrates an example network environment suitable for exploiting information pages pre-processed in accordance with the present invention. Network environment 700 includes web server 702 and a number of client computers 704 coupled to web server 702 through network 706. Web server 702 is provided with information pages formed with a language like XSL, using semi-structured data, like XML encoded data, stored in a structured data storage, and the information pages are pre-processed as earlier described, i.e. with the semi-structured queries being replaced by equivalent structured queries (and associated control structures, if any). Client computers 704 request selected ones of the information pages from web server 702. Web server 702 fulfills the requests, dynamically completing the information pages, retrieving the required data from the structured data storage, using the replacement equivalent structured queries. Accordingly, the requests of client computers 704 are fulfilled with shorter latencies.

Web server 702 and client computers 704 are intended to represent a broad range of server and computers known in the art. Network 706 is intended to represent a broad range of private and public networks, such as the Internet, constituted with networking equipment, such as routers, gateways, switches and the like.

Thus, a method and apparatus for storing semi-structured data in a structured manner, and for generating information pages using semi-structured data so stored have been described.

Epilogue

While the present invention has been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. A method in a computer system for converting semi-structured data to structured data, the method comprising:

providing a mapping data structure that maps elements of the semi-structured data to elements of the structured data;

generating a structured schema for the structured data based on the provided mapping data structure; and storing the semi-structured data as structured data in accordance with the generated structured schema wherein different mapping data structures can be provided to convert semi-structured data to structured data in accordance with different generated structured schemas.

2. The method of claim 1 wherein the provided mapping data structure is generated automatically from a semi-structured schema of the semi-structured data.

3. The method of claim 2 wherein the semi-structured schema is derived from analysis of the semi-structured data.

4. The method of claim 1 wherein the mapping data structure is generated manually.

5. The method of claim 1 wherein the semi-structured data is XML data.

6. The method of claim 1 wherein the structured schema defines a relational format.

7. The method of claim 1 including:

retrieving stored structured data; and storing the retrieved structured data as semi-structured data in accordance with the provided mapping data structure.

8. The method of claim 1 wherein the provided mapping data structure includes for each parent and child relationship in the semi-structured data, a mapping from a parent identifier and a child identifier of the parent and child relationship to a table identifier of a table in the structured data that corresponds to the parent and child relationship.

9. The method of claim 8 wherein each mapping further includes a parent key identifier and a child key identifier of the table that correspond to the parent identifier and child identifier of the mapping.

10. The method of claim 9 wherein each mapping further includes an indicator of whether a child of the parent and child relationship is an attribute or an element.

11. The method of claim 8 wherein the mapping supports recursive definition of elements of the semi-structured data.

12. The method of claim 8 wherein the mapping includes for each child of a parent and child relationship that is also not a parent, a mapping from the child identifier of that child to a table identifier of a table in the structured data.

13. The method of claim 12 wherein the mapping from the child identifier of that child also maps to a child key identifier in the table.

14. The method of claim 12 wherein the mapping from the child identifier of that child also maps to an indicator as to whether the child is an attribute or an element of its parent.

15. The method of claim 12 wherein the mapping from the child identifier of that child also maps to a child value identifier in the table.

16. A method in a computer system for converting data stored in an XML format into data stored in a relational format, the method comprising:

providing a mapping description between the data in the relational format and the data in the XML format wherein for each parent and child relationship in the XML data, the provided mapping description includes a mapping from a parent identifier and a child identifier of the parent and child relationship to a table identifier of a table defined by the relational schema that corresponds to the parent and child relationship;

generating a relational schema for the data in the relational format based on the provided mapping description; and storing the data in the XML format as data in the relational format in accordance with the generated relational schema and the provided mapping description.

17. The method of claim 16 wherein the provided mapping description is generated automatically from an XML schema for the data in the XML format.

18. The method of claim 17 wherein the XML schema is derived from analysis of the data in the XML format.

19. The method of claim 16 wherein the provided mapping description is generated manually.

20. The method of claim 16 including:

retrieving data stored in the relational format; and storing the retrieved data in the XML format in accordance with the provided mapping description.

21. The method of claim 16 wherein each mapping further includes a parent key identifier and a child key identifier of the table that correspond to the parent identifier and child identifier of the mapping.

22. The method of claim 21 wherein each mapping further includes an indicator of whether a child of the parent and child relationship is an attribute or an element.

23. The method of claim 16 wherein the mapping supports recursive definition of elements of the data in XML format.

24. The method of claim 16 wherein the mapping includes for each child of a parent and child relationship that is also not a parent, a mapping from the child identifier of that child to a table identifier of a table in the structured data.

25. The method of claim 24 wherein the mapping from the child identifier of that child also maps to a child key identifier in the table.

26. The method of claim 24 wherein the mapping from the child identifier of that child also maps to an indicator as to whether the child is an attribute or an element of its parent.

27. The method of claim 24 wherein the mapping from the child identifier of that child also maps to a child value identifier in the table.

28. A method in a computer system for converting structured data to semi-structured data, the method comprising:

providing a mapping data structure that maps elements of the structured data and elements of the semi-structured data; and generating a semi-structured schema for the semi-structured data based on the provided mapping data structure;

storing structured data as semi-structured data in accordance with the generated semi-structured schema wherein different mapping data structures can be provided to convert the structured data to semi-structured data in accordance with different generated semi-structured schemas.

29. The method of claim 28 wherein the provided mapping data structure is generated automatically from a structured schema for the structured data.

30. The method of claim 29 wherein the structured schema is derived from analysis of the structured data.

31. The method of claim 28 wherein the provided mapping data structure is generated by a user.

32. The method of claim 28 wherein the structured data is in a relational format.

33. The method of claim 28 wherein the generated semi-structured schema defines an XML format.

34. The method of claim 28 including:

retrieving stored semi-structured data; and storing the retrieved semi-structured data as structured data in accordance with the provided mapping data structure.

35. The method of claim 28 wherein the provided mapping data structure includes for each parent and child relationship of the semi-structured schema, a mapping from a parent identifier and a child identifier of the parent and child relationship to a table identifier of a table in the structured data that corresponds to the parent and child relationship.

36. The method of claim 35 wherein each mapping further includes a parent key identifier and a child key identifier of the table that correspond to the parent identifier and child identifier of the mapping.

37. The method of claim 36 wherein each mapping further includes an indicator of whether a child of the parent and child relationship is an attribute or an element.

38. The method of claim 37 wherein the mapping supports recursive definition of elements of the semi-structured data.

39. The method of claim 37 wherein the mapping includes for each child of a parent and child relationship that is also not a parent, a mapping from the child identifier of that child to a table identifier of a table in the structured data.

40. The method of claim 39 wherein the mapping from the child identifier of that child also maps to a child key identifier in the table.

41. The method of claim 39 wherein the mapping from the child identifier of that child also maps to an indicator as to whether the child is an attribute or an element of its parent.

42. The method of claim 39 wherein the mapping from the child identifier of that child also maps to a child value identifier in the table.

43. A method in a computer system for converting data stored in a relational format into data stored in an XML format, the method comprising:

providing a mapping description that maps the data in the relational format to the data in the XML format wherein for each parent and child relationship in the XML data, the generated mapping description includes a mapping from a parent identifier and a child identifier of the parent and child relationship to a table identifier of a table defined by the relational schema that corresponds to the parent and child relationship;

generating an XML schema for the data in the XML format based on the provided mapping description; and storing the data in the relational format as data in the XML format in accordance with the generated XML schema and the generated mapping description.

44. The method of claim 43 wherein the provided mapping description is automatically generated from a relational schema for the data in the relational format.

45. The method of claim 44 wherein the relational schema is derived from analysis of the data in the relational format.

46. The method of claim 43 wherein the provided mapping description is generated by a user.

47. The method of claim 43 including:

retrieving data stored in the XML format; and storing the retrieved data in the relational format in accordance with the generated mapping description.

48. The method of claim 43 wherein each mapping further includes a parent key identifier and a child key identifier of the table that correspond to the parent identifier and child identifier of the mapping.

49. The method of claim 48 wherein each mapping further includes an indicator of whether a child of the parent and child relationship is an attribute or an element.

50. The method of claim 43 wherein the mapping supports recursive definition of elements of the semi-structured data.

51. The method of claim 43 wherein the mapping includes for each child of a parent and child relationship that is also not a parent, a mapping from the child identifier of that child to a table identifier of a table in the structured data.

52. The method of claim 51 wherein the mapping from the child identifier of that child also maps to a child key identifier in the table.

53. The method of claim 51 wherein the mapping from the child identifier of that child also maps to an indicator as to whether the child is an attribute or an element of its parent.

54. The method of claim 51 wherein the mapping from the child identifier of that child also maps to a child value identifier in the table.

55. A computer system for converting data comprising:

a mapping means for mapping between structured data and semi-structured data;

means for storing semi-structured data as structured data in accordance with the mapping means; and means for storing structured data as semi-structured data in accordance with the mapping means.

56. The computer system of claim 55 including means for generating a semi-structured schema for the semi-structured data.

57. The computer system of claim 56 wherein the semi-structured schema is derived from analysis of the semi-structured data.

58. The computer system of claim 55 including means for generating a structured schema for the structured data.

59. The computer system of claim 58 wherein the structured schema is derived from analysis of the structured data.

60. The computer system of claim 55 wherein the semi-structured data is in an XML format.

61. The computer system of claim 55 wherein the structured data is in a relational format.

62. The computer system of claim 55 wherein the mapping means includes for each parent and child relationship in the semi-structured data, a mapping from a parent identifier and a child identifier of the parent and child relationship to a table identifier of a table in the structured data that corresponds to the parent and child relationship.

63. The computer system of claim 62 wherein each mapping further includes a parent key identifier and a child key identifier of the table that correspond to the parent identifier and child identifier of the mapping.

64. A method in a computer system for converting data between a semi-structured format and a structured format, the method comprising:

providing a mapping data structure that maps elements of the structured format and elements of the semi-structured format;

retrieving data in one of the formats; and storing the retrieved data in the other format in accordance with the provided mapping data structure wherein different mapping data structures can be used to convert data having one schema to data having another schema.

65. The method of claim 64 wherein a schema for a format is derived from analysis of data in that format.

66. The method of claim 64 wherein the semi-structured format is an XML format.

67. The method of claim 64 wherein the structured format is a relational format.

68. The method of claim 64 wherein the generated mapping includes for each parent and child relationship in the semi-structured data, a mapping from a parent identifier and a child identifier of the parent and child relationship to a table identifier of a table in the structured data that corresponds to the parent and child relationship.

69. The method of claim 68 wherein each mapping further includes a parent key identifier and a child key identifier of the table that correspond to the parent identifier and child identifier of the mapping.

70. A method in a computer system for storing data in a semi-structured format and a structured format, the method comprising:

providing a mapping between the structured format and the semi-structured format;

converting data in the structured format to data in the semi-structured format in accordance with the provided mapping; and converting data in the semi-structured format to data in the structured format in accordance with the provided mapping wherein different mappings can be used to convert the same data into different formats.

71. The method of claim 70 wherein the provided mapping is automatically generated by the computer system based on a structured schema for data in the structured format and on a semi-structured schema for data in the semi-structured format.

72. The method of claim 71 wherein the schema for a format is derived from analysis of data in that format.

73. The method of claim 70 wherein the provided mapping is manually generated by a user.

74. The method of claim 70 wherein the semi-structured format is an XML format.

75. The method of claim 70 wherein the structured format is a relational format.

76. The method of claim 70 wherein the provided mapping includes for each parent and child relationship in the semi-structured data, a mapping from a parent identifier and a child identifier of the parent and child relationship to a table identifier of a table in the structured data that corresponds to the parent and child relationship.

77. The method of claim 76 wherein each mapping further includes a parent key identifier and a child key identifier of the table that correspond to the parent identifier and child identifier of the mapping.

* * * * *